US006782294B2

(12) United States Patent
Reich et al.

(10) Patent No.: US 6,782,294 B2
(45) Date of Patent: Aug. 24, 2004

(54) INTERNET BASED DISTRIBUTED CONTROL SYSTEM

(75) Inventors: Daniel Reich, Tucson, AZ (US); Boris Kaplinsky, Sierra Madre, CA (US); Vladi Reich, Tucson, AZ (US); Yury Stolyarov, Moscow (RU)

(73) Assignee: Arecont Intellectual Property Holdings, LLC, Tucson, AZ (US)

( * ) Notice: Subject to any disclaimer, the term of this patent is extended or adjusted under 35 U.S.C. 154(b) by 0 days.

(21) Appl. No.: 10/368,829

(22) Filed: Feb. 19, 2003

(65) Prior Publication Data

US 2003/0182396 A1 Sep. 25, 2003

Related U.S. Application Data

(60) Provisional application No. 60/366,263, filed on Mar. 2, 2002.

(51) Int. Cl.[7] .............................................. G05B 11/01
(52) U.S. Cl. .................... 700/19; 700/2; 700/3; 700/20; 700/83; 709/217; 709/218; 709/202; 709/203
(58) Field of Search ........................ 700/2–5, 9, 19, 700/20, 17–18, 83–86; 709/217, 218, 219, 220, 201, 202, 203

(56) References Cited

U.S. PATENT DOCUMENTS

| | | | | |
|---|---|---|---|---|
| 5,930,768 A | * | 7/1999 | Hooban ....................... 705/27 |
| 5,971,597 A | | 10/1999 | Baldwin et al. ....... 364/528.12 |
| 6,098,893 A | | 8/2000 | Berglund et al. ............. 236/51 |
| 6,122,678 A | | 9/2000 | Eckel et al. ................... 710/15 |
| 6,145,751 A | | 11/2000 | Ahmed ......................... 236/51 |
| 6,147,601 A | | 11/2000 | Sandelman et al. ......... 340/506 |
| 6,285,912 B1 | | 9/2001 | Ellison et al. ................. 700/11 |
| 6,304,788 B1 | | 10/2001 | Eady et al. .................... 700/86 |
| 6,317,701 B1 | | 11/2001 | Pyotsia et al. .............. 702/188 |
| 6,338,437 B1 | | 1/2002 | Kline et al. ................ 236/49.3 |
| 6,363,421 B2 | | 3/2002 | Barker et al. ............... 709/223 |
| 6,366,832 B2 | | 4/2002 | Lomonaco et al. ......... 700/276 |
| 6,463,585 B1 | * | 10/2002 | Hendricks et al. ............ 725/35 |
| 6,484,061 B2 | | 11/2002 | Papadopoulos et al. ....... 700/83 |
| 6,519,568 B1 | * | 2/2003 | Harvey et al. ................. 705/1 |
| 6,587,884 B1 | * | 7/2003 | Papadopoulos et al. ..... 709/230 |
| 6,615,088 B1 | * | 9/2003 | Myer et al. .................... 700/20 |
| 6,631,416 B2 | * | 10/2003 | Bendinelli et al. .......... 709/227 |
| 2002/0002580 A1 | * | 1/2002 | Nurick ....................... 709/202 |
| 2002/0120521 A1 | * | 8/2002 | Forth et al. ................... 705/26 |
| 2002/0169825 A1 | * | 11/2002 | Hougland et al. .......... 709/203 |
| 2003/0204756 A1 | * | 10/2003 | Ransom et al. ............. 713/300 |

\* cited by examiner

*Primary Examiner*—Ramesh Patel
(74) *Attorney, Agent, or Firm*—Quarles & Brady Streich Lang LLP

(57) ABSTRACT

In an Internet Based Distributed Control System, communication between one or more Clients and one or more controllers is managed by an Internet Hub. A small, inexpensive Web Server reduces the hardware and software resources required to remotely manage controllers through the Internet. One or more Internet Hubs maintain control of the human-machine interface of the system's controllers, increasing security and reducing system cost. Controllers only accept data packets from authorized Internet Hubs and send regular status update information to those Hubs. If alarms are generated, the system is capable of generating and transmitting human readable messages or alarms via e-mail, fax, SMS, or telephone. Controllers are grouped into Local Control Systems in either Peer-to-Peer networks or Master-Slave configurations.

42 Claims, 7 Drawing Sheets

INTERNET BASED CONTROL SYSTEM

INTERNET BASED CONTROL SYSTEM (PRIOR ART)

INTERNET BASED DISTRIBUTED CONTROL SYSTEM

RELATED APPLICATIONS

This application claims the filing date benefit of U.S. Provisional Patent Application Serial No. 60/366,263 filed on Mar. 2, 2002 which is incorporated by reference in its entirety for any purpose.

BACKGROUND OF THE INVENTION

1. Field of the Invention

This invention is related in general to the field of distributed control systems. In particular, the invention comprises utilizing the Internet to monitor and control geographically distributed controllers. An Internet Hub is utilized to facilitate communications between Clients and controllers.

2. Description of the Prior Art

It is very common to use electo-mechanical devices to control any of a myriad of different types of equipment. For example, relays are used to close doors, motor drivers are used to turn fans, and optical switches are used to turn on street-lamps. These electro-mechanical devices, referred to as controllers, often can be quite sophisticated and capable of performing advanced algorithmic calculations. For example, heating, ventilation and air conditioning (HVAC) controllers often possess computer processors used to analyze and respond to their environment such as changes in temperature, pressure, and humidity. They can even develop efficient heating and cooling plans in response to anticipated weather patterns.

Controllers often have sensors that sample their environment and return values in the form of variables. For example, a controller used to activate a variable-speed exhaust fan may utilize a temperature sensor to report the ambient air temperature in a room. Additionally, controllers have operating parameters that control their behavior. In the example of the variable-speed exhaust fan, the controller may be set to activate a fan when the ambient air temperature exceeds 90 degrees and linearly increase the fan speed as the temperature increases until the fan has reached its maximum rate of revolution. Additional parameters may be provided as triggers for messages or alarms. For example, if the ambient air temperature exceeds a predetermined parameter or the exhaust fan is spinning at an unacceptable rate, a message or alarm may be generated. A computer is sometimes connected to a controller to program its parameters, direct its behavior, and retrieve and display its status information, messages, and alarms.

Controllers can work alone or in clusters. If more than one controller is utilized, a master controller coordinates the efforts of the others. In some applications, slave controllers communicate with the master controller via a Local Area Network (LAN) such as an RS485 based LAN. If intra-communication is desired between master controllers, an Ethernet based LAN may be used.

In some applications, controllers may be distributed throughout large industrial or commercial buildings. In other applications, large distances may geographically separate controllers. In the former, controllers may be connected using either wired networks or wireless communications networks such as that embodied by IEEE standard 803.3 or 802.11. In the latter, telecommunications systems such as modems, DSL, cable, and satellite communications are the prevalent methods of connecting controllers.

With the advent of the Internet, it has become possible to connect controllers together using the World Wide Web (WWW). The Internet is formed by interconnecting communications devices such as switches, routers and servers. Information is carried via fiber-optics, phone lines, cable lines, microwave transmission, wireless digital radio transmission, and satellite communication. The Internet is a layered network communication system governed by the Open Systems Interconnection (OSI) model. Messages are sent over the Internet using transmission protocols (the fourth layer of the OSI model) such as Transmission Control Protocol/Internet Protocol (TCP/IP) or User Datagram Protocol/Internet Protocol (UDP/IP). The highest layer of the OSI model involves application software. Web browsers are utilized to convert messages into a human readable format.

To facilitate remote access, web servers are connected to controllers. A common web server includes a standard or industrial grade single-board computer, a connection to the Internet, access to an Internet Service Provider, and a means for communicating with the controller. Additionally, applications software is needed to both access the Internet and communicate with the controller. In some cases, this software requires an additional licensing fee.

Once a web server has been connected to a controller, it is a straightforward matter to provide access to the controller from another remote computer from practically any remote location over the Internet, as shown in FIG. 1. One or more Clients 10 provide user access to the Internet 12 in order to communicate with one or more controllers 14 through a web server 15. In this manner, a user may direct the behavior of the controller and receive updates on status information, messages, and alarms. FIG. 2 illustrates some examples of clients, such as a personal computer 16, an Internet-ready personal digital assistant (PDA) 18, or an Internet-ready wireless telephone 20.

While convenient, remotely accessing a controller through the Internet is not without certain problems. The first is a severe reduction in security, as it is relatively easy to gain unauthorized access to the controller's web server. The second is that attaching a standard web server to each controller, or even limiting this to each master controller, is a significant investment of capital as each web server requires its own computer. Therefore, it is desirable to provide a means for providing remote access and control of distributed controllers over the Internet while maintaining security and minimizing the cost of associated web servers.

SUMMARY OF THE INVENTION

This invention is based on utilizing an Internet Hub to intercede in communications between Clients and Local Control Systems (LCS). A Local Control System includes at least one Master Controller and may include one or more Slave controllers. The resource intensive web server, formerly comprising a full-fledged computer, has been replaced with a small, inexpensive microprocessor based device.

One aspect of this invention is a means for remotely accessing Local Control Systems over the Internet while maintaining security. To this end, Clients are not permitted to directly access the controllers and may communicate only with the Internet Hub. Likewise, the scaled-down Web Servers only communicate with the Internet Hub on one side and the controller on the other. Additionally, a Web Server will only accept messages from authorized Internet Hubs. This maintains security and prevents unauthorized access of the Local Control System.

Another aspect of this invention is to reduce the hardware, applications software, and the associated cost required to remotely access Local Control Systems. The Internet Hub is used to remotely install programs and update parameters in individual controllers. It also retrieves status information from the controllers, over the Internet. This eliminates the need for a computer, applications software, and their associated costs at each Local Control System. In order for a user to monitor a controller, he must first access the Internet Hub which, in turn, accesses the Local Control System. Likewise, in order to program or update a controller, a user must send his requests to the Internet Hub where they are repackaged and retransmitted.

Yet another aspect of this invention is to provide a means of notifying users if established operating parameters have been exceeded by Local Control Systems. The Master Controller is responsible for providing regular updates of status information, messages, and alarms to the Internet Hub. Messages and alarms received by the Internet Hub are interpreted and then dispersed to users as e-mail, faxes, SMS messages, or phone calls.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

Figure 1:
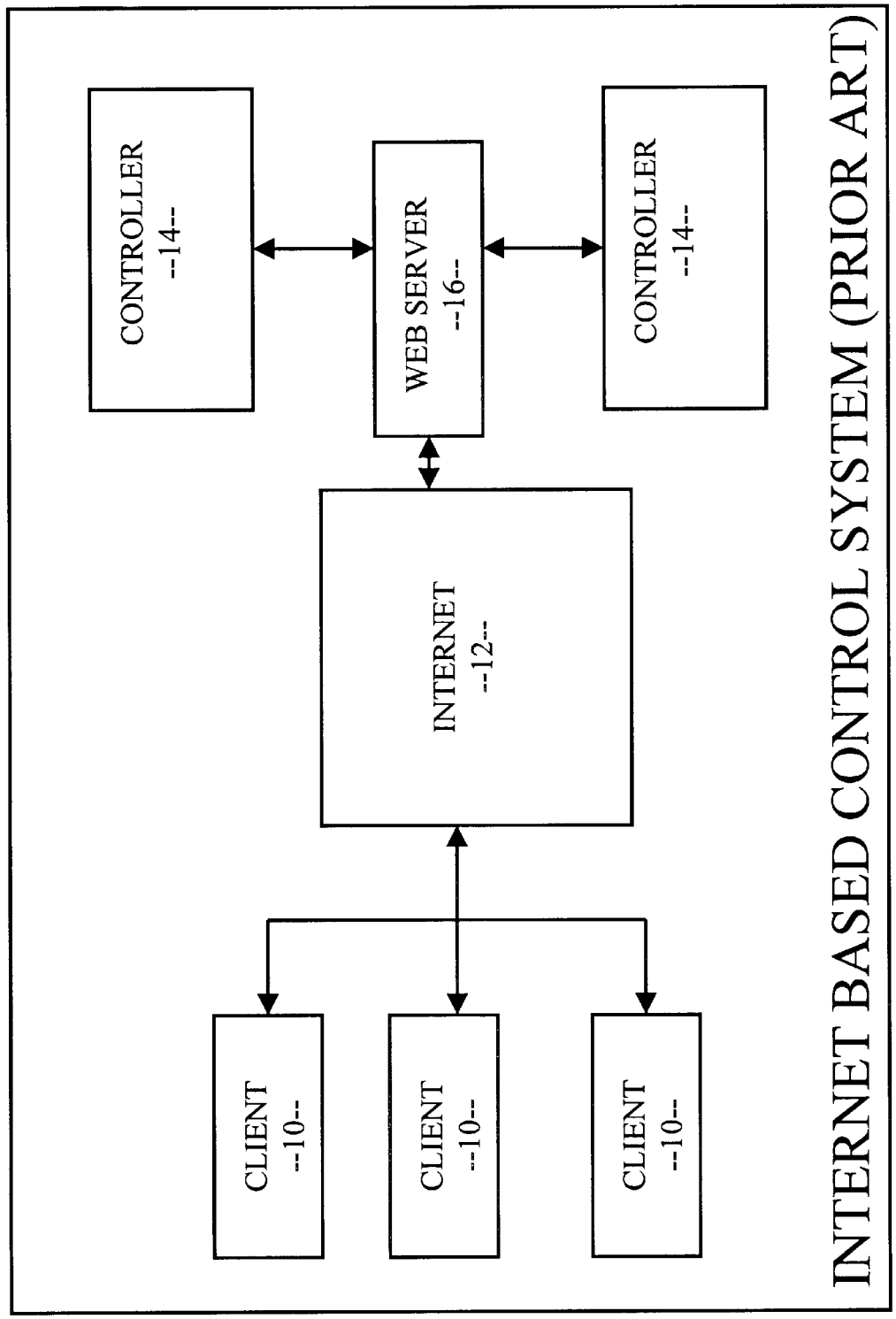
FIG. 1 is an illustration indicating the state of the art prior to introduction of the invention.
Figure 2:
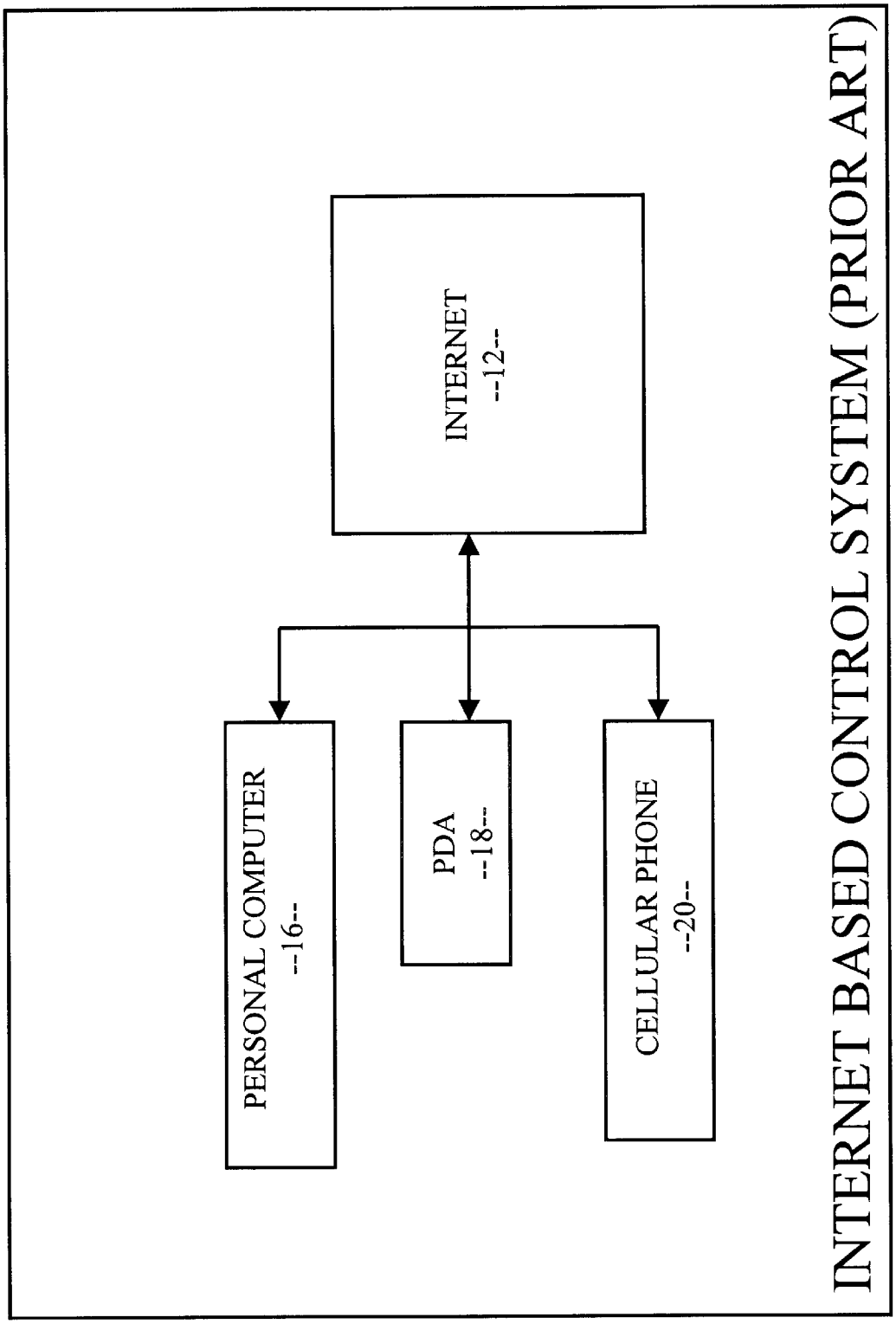
FIG. 2 is an illustration portraying exemplary Clients attached to the Internet.
Figure 3:
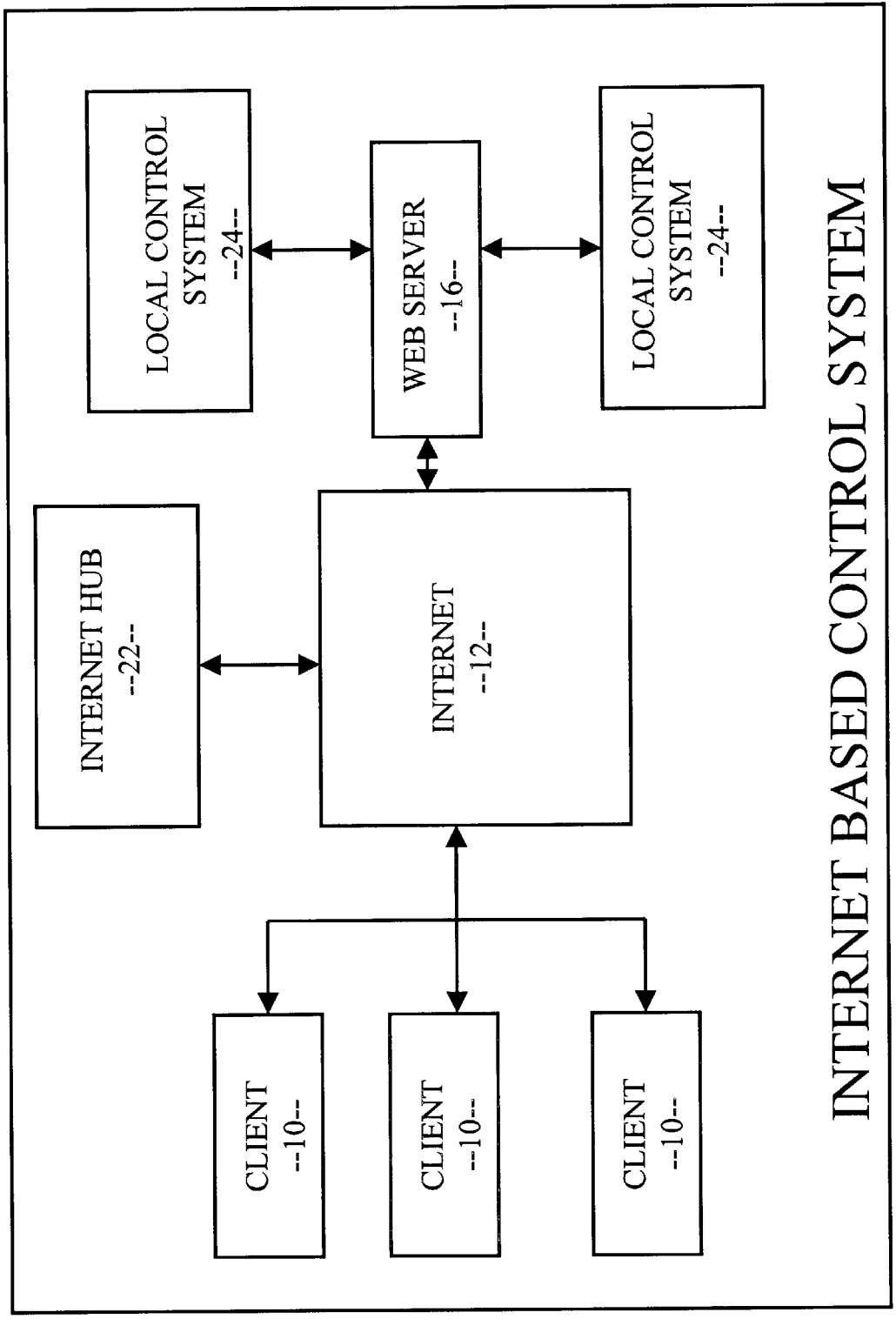
FIG. 3 is an illustration indicating the communication path and control introduced by the invention.

As a general overview of the invention, FIG. 3 shows one or more Clients 10, an Internet Hub 22, and one or more Local Control Systems 24 communicating over the Internet 12. A user 26 wishing to access a controller residing in a Local Control System utilizes a Client similar to those exemplified in FIG. 4, such as a computer 16, PDA 18, or wireless telephone 20.

Structure

In the preferred embodiment of the invention, interaction between a user 26 and the Client 10 occurs through a software application referred to as a human-machine interface (HMI) 28. Each Internet Hub 22 contains HMIs for each controller which resides in each Local Control System 24. Upon a request generated by a Client, these HMIs are transferred to the Clients through the Internet 12 using HTTP and TCP/IP protocols 30 and displayed with the held of a standard web browser such as Internet Explorer or Netscape Navigator.

Figure 5:
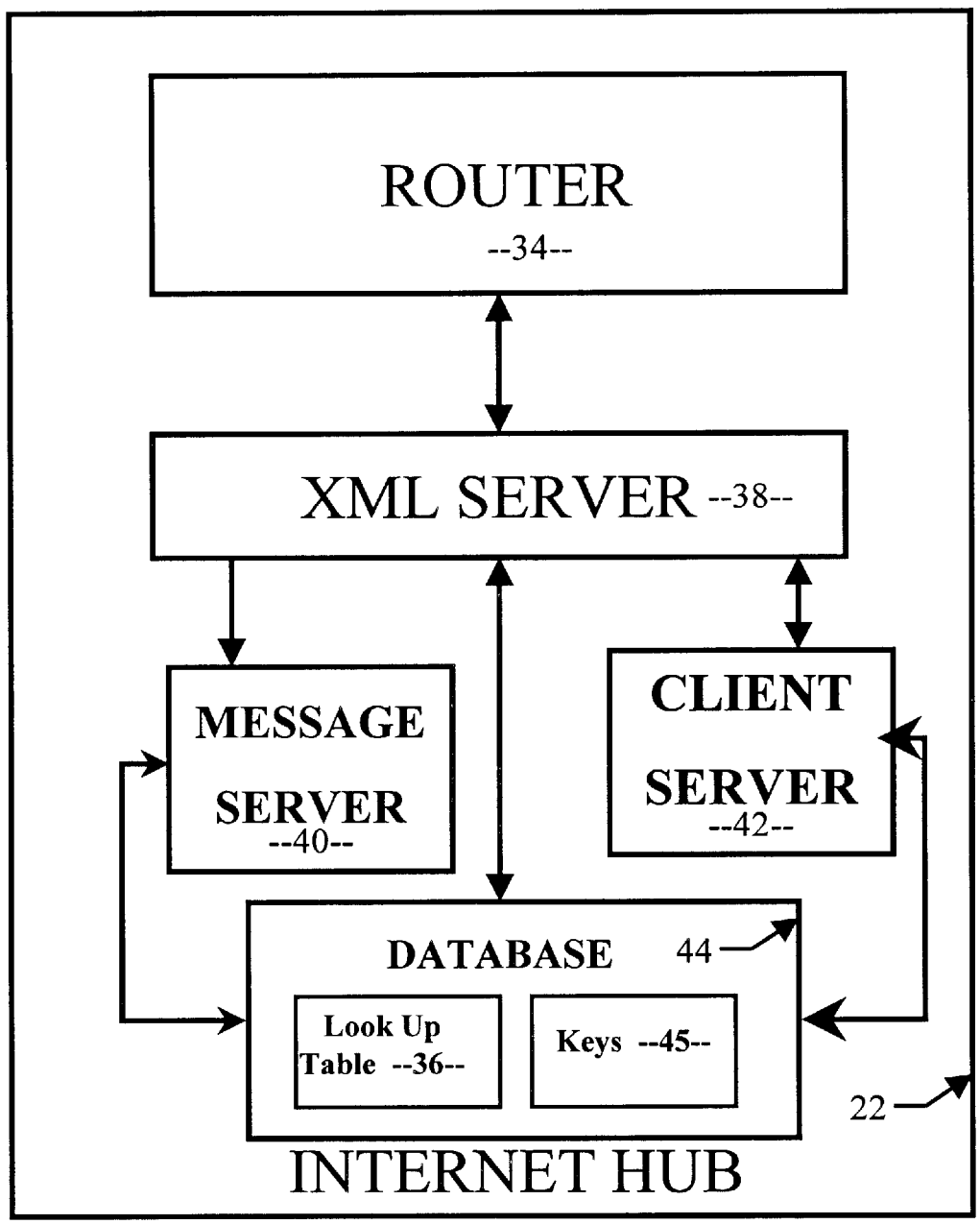
FIG. 5 is a block diagram illustrating the software constructs of the Internet Hub of a preferred embodiment according to the invention.

The Internet Hub includes one or more computers with memory and optional displays. In the preferred embodiment of the invention, the Hub includes a message router that is a software construct stored in memory. FIG. 5 is a block diagram illustrating the main components of the Internet Hub 22 (FIG. 3). Data packets enter the Internet Hub at the. Router 34. Packets arriving from a Client 10 are examined to determine their intended target Local Control System 24. This destination address is used to locate a corresponding IP address residing in a look-up table 36 residing in the Database 44. The data packet is then re-addressed, re-packaged by the Router 34, and re-directed to the corresponding Local Control System 24. The Extensible Markup Language (XML) Server 38, the Message Server 40, the Client Server 42, and the Database 44 are software constructs residing in the memory of the Internet Hub computer.

While communication between the Internet Hub 22 and the Client 10 utilizes the TCP/IP protocol, communication between the Internet Hub and the Local Control System 24 may utilize either the TCP/IP or the UPD/IP protocol. Data packets arriving at the Internet Hub 22 from Local Control Systems 24 are examined by the Router to determine if their destination is either a Client or a controller. If the destination is a controller, the packet is re-addressed and re-transmitted back to the corresponding Local Control System. If the target is a Client, the packet is directed to the XML Server 38 (FIG. 5) where it is translated into an XML compatible format. If the packet contains a message or an alarm, it is passed to the Message Server 40, where it generates an e-mail, fax, SMS message, phone call, or other human-readable message. Other non-alarm generating data packets are passed to the Client Server 42 where they are converted to HTML format web pages. The Client server packages theses HTML web pages with relevant ActiveX controls and transmits them to their respective Client 10.

In addition to maintaining the Look Up Table 36, the Database 44 also holds the "keys" to the controllers. These keys are copies of memory areas of controllers which have registered with this particular Internet Hub and contains the program, descriptors, parameters, variables, and alarms of the associated controllers. XML format representations of these descriptors are passed to the Clients in the form of HMIs.

Figure 6:
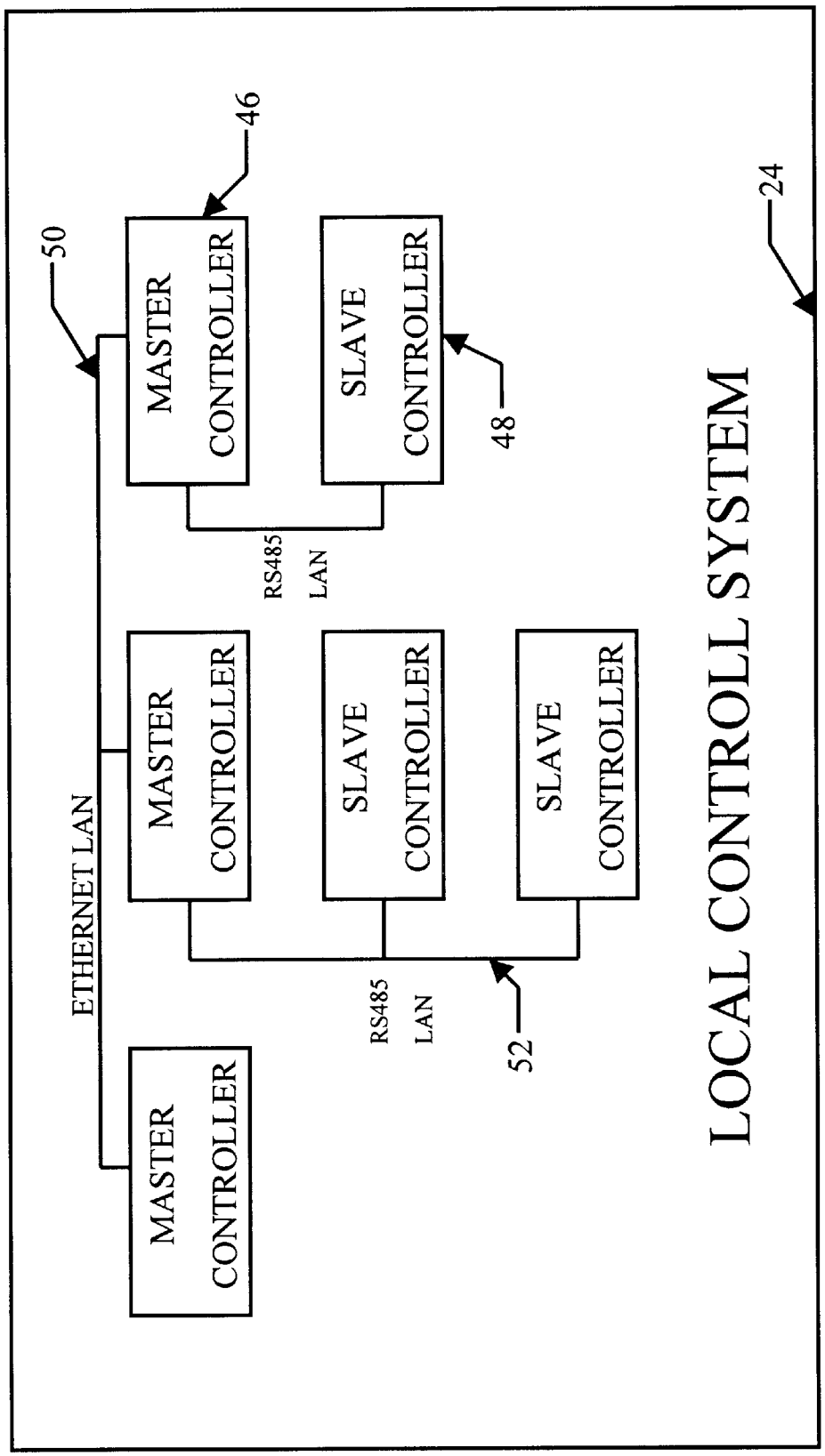
FIG. 6 is a block diagram exemplary of a Local Control System according to the invention.

A Local Control System 24, illustrated in FIG. 6, is a collection of Master Controllers 46 and Slave Controllers 48, with a minimum requirement of only a single Master Controller. In the preferred embodiment of the invention intra-communication between Master Controllers utilizes an Ethernet LAN 50 and master/slave communications are transmitted over a RS485 based LAN 52. In another embodiment of the invention, Master Controllers may be arranged in a peer-to-peer configuration.

Figure 7:
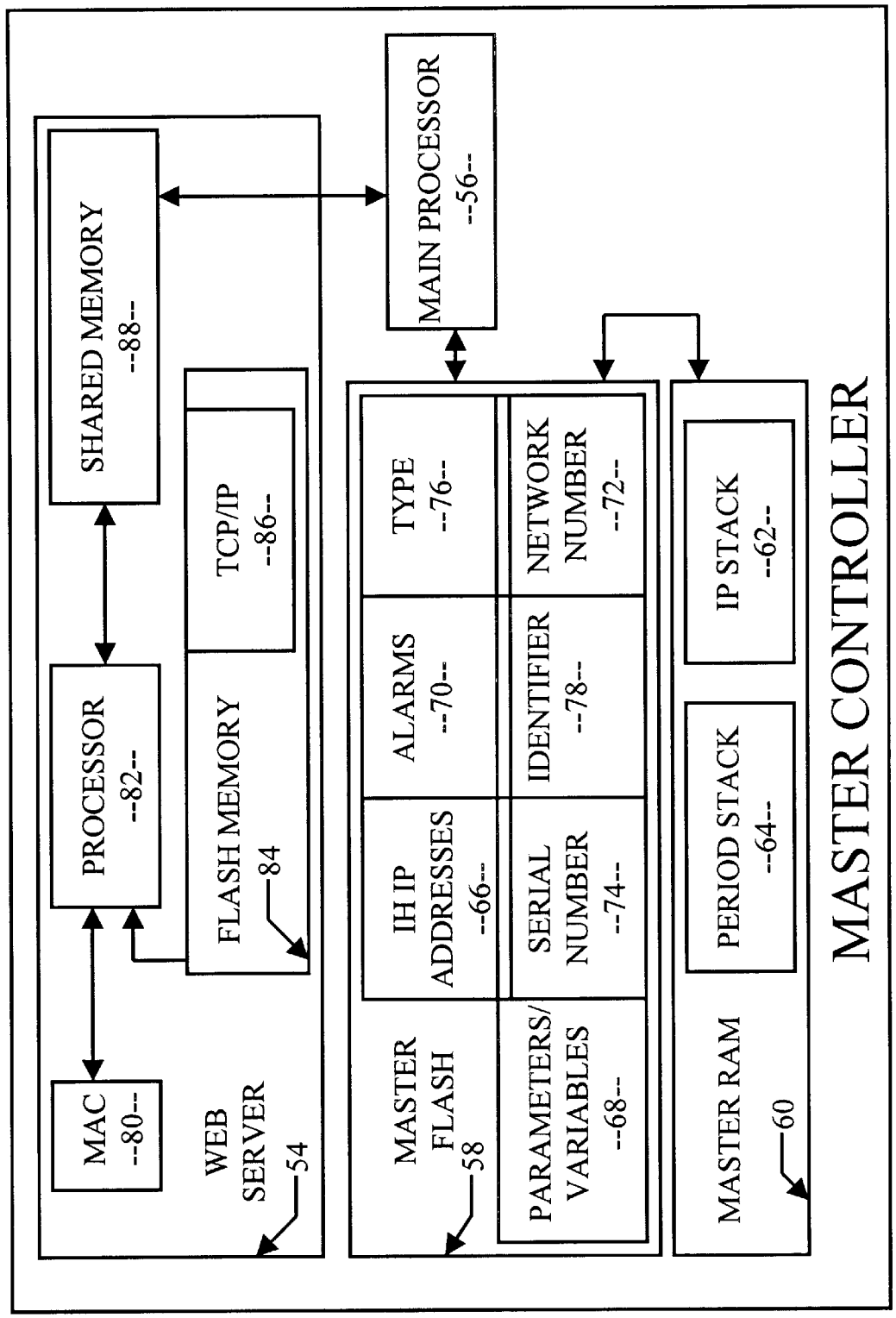
FIG. 7 is a block diagram illustrating the components of the Master Controller according to the invention.

The Master Controller 46 includes a Web Server 54, a Main Processor 56, a Master Flash Memory 58, and a Master Random Access Memory (RAM) 60, as shown in FIG. 7. The RAM includes an IP Stack 62 used to hold addresses of Internet Hubs which currently maintain open sessions with the Master Controller and a Period Stack 64 used to hold entries which correspond to the IP address stack entries. The Period Stack entries indicate the frequency at which information is sent from the Master Controller 46 to the Internet Hub 22 at the IP address of the corresponding entry of the IP Stack. The Master Flash Memory 58 holds the authorized Internet Hub addresses 66, parameters and variables 68, alarms 70, network number 72, serial number 74, type 76, and identifier 78.

The Web Server 54 is connected to the Ethernet 50 and, by extension, to the Internet. Data packets enter and exit the Local Control System through the Web Server while the Main Processor 56 is responsible for the algorithmic functions of the Master Controller 46 (FIG. 6) and coordinating the activities of the Slave controllers 48.

The Web Server 54, illustrated by the block diagram of FIG. 8, has an Ethernet (Media Access Controller) chip 80 that is used to make a network connection to the Ethernet LAN 50 (FIG. 6). Additionally, the Web Server contains its own processor 82 and program memory 84. The program memory may contain a TCP/IP stack 86. The TCP/IP Stack 68 can be configured to accommodate either UPD/IP or TCP/IP data packets. The Shared Memory 88 is a common random access memory (RAM) location that can be accessed by both the Web Server and the Main Processor, an efficient method of passing information.

The primary advantage of this structure is that the human-machine interface required to interact with each Master Controller has now been relegated to the Internet Hub (FIG. 3). A few Internet Hubs can now service a vast number of controllers. Hardware and software intensive Internet and human-machine interfaces have been replaced with streamlined, efficient, and cost-effective Web Servers.

Additionally, persons intent on hacking or vandalizing controllers can no longer gain direct access to the controllers. Access to the controllers is routed through the Internet Hubs and communication is done via a proprietary protocol.
Function The Internet Based Distributed Control System of the invention has five primary modes of operation that are the subject of this application: (1) programming, (2) parameter change, (3) monitoring, (4) messaging, and (5) inter-controller communication utilizing the Internet. Additionally, the system has the ability to communicate between Master and Slave controllers utilizing the RS485 based LAN and between Master Controllers within a Local Control System over the Ethernet based LAN. However, these communications are not the subject matter of this patent application; therefore, they are not addressed in detail in this disclosure.

In the preferred embodiment of the invention, there are two methods of programming controllers. The first method entails pre-loading into non-volatile memory of each controller a description of its variables, parameters, and alarms. Non-volatile memory 58 (FIG. 7) of each Master Controller 46 (FIG. 6) is programmed with the type, identification, unique serial number, and network number of each controller associated with it. Additionally, the static IP addresses 66 (FIG. 7) of authorized Internet Hubs 22 (FIG. 3) are written to the non-volatile memory 58 of the Master Controllers.

When the Local Control System 24 is first connected to the Internet 12, it announces its presence to the authorized Internet Hub 22 (FIG. 3) and attempts to establish a connection. Once a connection has been established, the Internet Hub determines if it has a copy of each Master and Slave Controller's 46, 48 (FIG. 6) descriptors. If not, the registration process begins.

During the registration process, each Master Controller's information including parameters, variables, alarms, messages, descriptions as well as corresponding information from associated Slave Controllers 48 (FIG. 6) are transferred to the Internet Hub. The XML Server 38 (FIG. 5) converts this information to XML format and stores the information as a key in the Database 44 (FIG. 5). If more than one Internet Hub is authorized for a Local Control System's Master Controllers, the Local Control System will attempt to establish a connection with each Hub and repeat the above-described process. This provides for redundancy in case one of the Internet Hubs fails or is taken off line for maintenance.

Maintaining security during programming is critical to prevent unauthorized access, hacking, and vandalism of the control system. Each data packet received by the Master Controller contains an IP address. This address is compared against the table of authorized Internet Hubs 22 and only those packets bearing authorized addresses are accepted. Additionally, all packets arriving from the Internet Hub are encrypted using rotating cryptographic blocks. These security measures are used for all communications arriving at the Local Control Systems, and are not limited to program applications.

The second method of programming is initiated by connecting to the Internet a Local Control System 24 (FIG. 3) which only has authorized IP addresses 66 (FIG. 7) loaded into non-volatile memory 58. Each Master Controller 46 (FIG. 6) generates a "heart-beat" message on a regular basis, irregardless or whether it has been programmed. In the preferred embodiment of the invention, a heart-beat consists of a broadcast message from each Master Controller to every IP address stored in its non-volatile memory. This message consists of the Master Controller's unique serial number 74 and current IP address and is broadcast every ten minutes.

If an Internet Hub receives a heart-beat message from a non-programmed Local Control System but already possesses a key 45 (FIG. 5) for that controller in its Database 44, the Internet Hub 22 (FIG. 3) will initiate a page by page programming of the Master Controller's Master Flash Memory 58. Alternatively, a user 26 (FIG. 4) can initiate programming of a Master Controller.

A user interfaces with a Client 10 through a software application to indicate a request to change the program of a Master Controller 46 (FIG. 6) or Slave Controller 48. The request is converted into a data packet using the TCP/IP protocol and is transmitted, over the Internet 12, to the Internet Hub 22 (FIG. 3). Recognizing that the source of the packet is a Client 10 and that the target is a Local Control System 24, the Router 34 (FIG. 5) uses the target address to locate the IP address of the intended controller in its Look Up Table 36 (FIG. 5). The target address of the controller may either be static or dynamic and must be updated regularly by the corresponding Master Controller. The packet is then repackaged, as needed, and retransmitted to the corresponding Local Control System 24. The packet is received by the Web Server 54 (FIG. 7), put in the shared memory 58, read by the main processor 56, and resent to the appropriate Slave Controller 48. As a final step, after programming a controller through the Internet a registration process must be initiated.

Changing parameters is similar to changing a controller's program but requires a more interactive approach, a novel aspect of the invention. The first packet from the Internet Hub 22 (FIG. 3) is a preliminary message containing a "flag." Once a flag has been received and "set," the Master Controller 46 (FIG. 6) sends an acknowledgement. The Internet Hub then sends an execution data packet containing the address of the target Master or Slave Controller, the parameter address, and the new parameter value. Two mechanisms ensure that no parameter is inadvertently changed. The first is a timing mechanism whereby a delay between the preliminary data packet containing the flag and the execution data packet will result in the flag being reset. If any other packet arrives other than the execution data packet after the flag has been set, the flag will be reset. Unauthorized changing of parameters is prevented by utilizing encrypted passwords, which are changed after every data packet.

Allowing a user 26 (FIG. 4) to monitor a controller's parameters and variables representing its environment is an important aspect of the invention. Interaction with a Master Controller 46 (FIG. 6), including programming, changing parameters, and monitoring begins by opening a session and ends by closing a session. Each Master Controller maintains two session stacks: an IP stack and a Period stack. Each data packet received by the Local Control System 24 (FIG. 3) contains a command code. If the command code is "Open Session," the sender's IP address is added to the IP stack, if not already present. Every "Open Session" command is accompanied by a "Period" value. This value is written to the Period stack. The frequency at which status update information is provided to the Internet Hub is controlled by the values in the Period stack.

Once a session has been opened, a user may issue commands to change parameters, reprogram controllers, or monitor the controller environment. Each Internet Hub 22 maintains a Database 44 (FIG. 5) of all controllers, parameters, and variables associated with each of its associated Local Control System 24 (FIG. 3). This information is placed directly into an Internet Hub by a user 26 or through the registration process, described above. During a monitoring session, each Web Server 54 (FIG. 7) transmits a coded train of bytes to the Internet Hub representing values for parameters and variables. This coded train of bytes is interpreted by the XML Server 38 (FIG. 5) and passed to either the Message Server 40, the Client Server 42. The parameters and variables in the MPVP are refreshed on a regular basis by the Main Processor 56 (FIG. 7) and sent to the Internet Hub with the frequency dictated by the entry of the period stack.

Multiple users 26 (FIG. 4) may initiate multiple open sessions through the same Internet Hub to the same Master Controller. This results in a single Internet Hub 22 (FIG. 3) potentially having multiple entries in a Master Controller's IP Stack. Yet another novel feature, each IP Stack entry has an associated Period Stack entry governing how often information-status pages are transmitted to the Internet Hub. When a Client 10 has completed its session, a data packet containing a "close-session" command code is issued and the Master Controller removes an entry associated with the Internet Hub from the IP stack. However, if other entries associated with that particular Internet Hub still reside in the IP stack, the XML Server will continue to receive information status pages. Only when the last entry for a particular Internet Hub has been removed from the IP Stack will the Master Controller discontinue sending monitoring messages to the corresponding Internet Hub.

Figure 4:
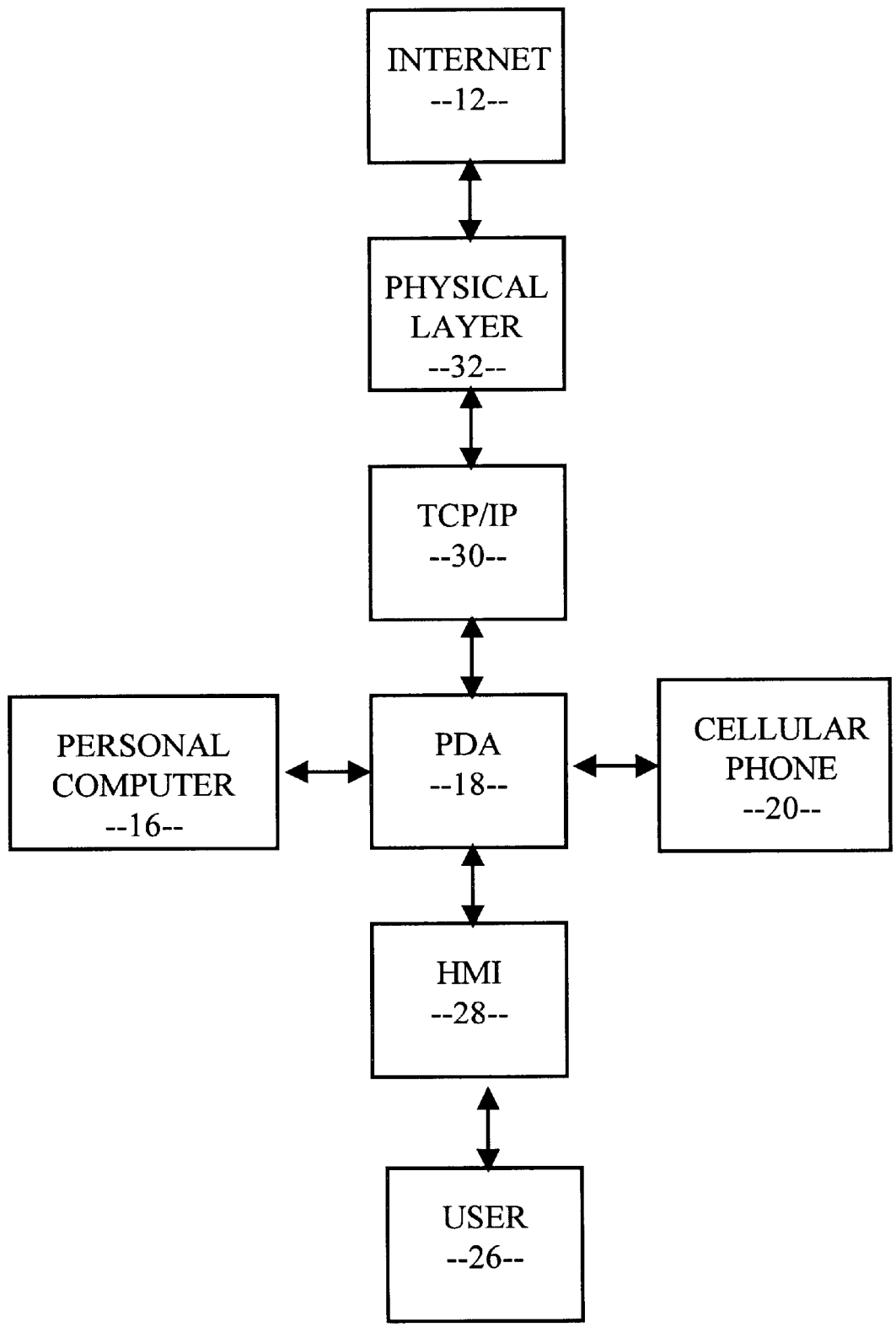
FIG. 4 is an illustration indicating the layers of network protocol between a user and the Internet.

A convenient feature of the invention is the ability to generate human readable messages and alarms and have them transmitted to users in a variety of methods, such as by e-mail, fax, SMS message, or phone call. If an alarm or message condition is generated in any controller of a Local Control System, the Main Processor 56 (FIG. 7) adds message or alarm data packets to heart-beat messages which are sent to authorized Internet Hubs on a regular basis. Once received by the Internet Hub, the XML Server 38 (FIG. 5) interprets the message/alarm data packet and routs it to the Message Server 40. The Message Server converts the message to a human readable format and transmits it to the intended user 26 (FIG. 4).

Yet another mode of operation is the ability for Master Controllers 46 (FIG. 6) to communicate with other Master Controllers in other Local Control Systems 24 (FIG. 3) using the Internet Based Distributed Control System of the invention. Data packets arriving from a Local Control System addressed to a Master Controller are simply re-addressed by the Router 34 (FIG. 5) and transmitted to the target Local Control System. This simple, yet effective, method of communication dramatically increases the geographic and spatial area that can be coordinated in tandem by controllers.

Others skilled in the art of making distributed control systems may develop other embodiments of the present invention. For example, a Client may be envisioned that operates without human intervention or an Internet Hub may be utilized that does not possess a graphical interface or a Message Server. The embodiments described herein are but a few of the modes of the invention. Therefore, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. An Internet based distributed control system, comprising:
   at least one client with an algorithmic device and an Internet compatible interface;
   at least one local control system with at least one master controller that includes a web server; and
   at least one Internet hub with a router whereby communications between said at least one client and said at least one local control system are transmitted over the Internet and are controlled by said at least one Internet hub.

2. The Internet based distributed control system of claim 1, wherein said at least one Internet hub further comprises an Extensible Markup Language (XML) server for converting transport layer protocol data packets into XML format messages.

3. The Internet based distributed control system of claim 2, wherein said at least one Internet hub further comprises a message server for converting XML format messages into human readable messages for transmission to users.

4. The Internet based distributed control system of claim 3, wherein said human readable messages are e-mails, faxes, SMS messages, or phone calls.

5. The Internet based distributed control system of claim 3, wherein said at least one Internet hub further comprises a client server for converting XML format messages into Hypertext Markup Language (HTML) messages.

6. The Internet based distributed control system of claim 3, wherein said at least one Internet hub further comprises a database for storing keys.

7. The Internet based distributed control system of claim 1, wherein said at least one Internet hub further comprises:
   an Extensible Markup Language (XML) server for converting transport layer protocol data packets into XML format messages;
   a message server for converting XML format messages into human readable messages for transmission to users, wherein said human readable messages are e-mails, faxes, SMS messages, or phone calls;
   a client server for converting said XML format messages into Hypertext Markup Language (HTML) messages; and
   a database for storing controller descriptors.

8. The Internet based distributed control system of claim 1, wherein said at least one local control system comprises at least one slave controller.

9. The Internet based distributed control system of claim 8, wherein said at least one local control system further comprises a first Local Area Network (LAN) for connecting a plurality of master controllers to each other and to the Internet.

10. The Internet based distributed control system of claim 9, wherein said at least one local control system further comprises a second Local Area Network for connecting said at least one slave controller to said at least one master controller.

11. The Internet based distributed control system of claim 10, wherein said at least one master controller further comprises:
a main processor; and
a web server including a shared memory for efficient and secure transmission of information from the at least one Internet hub to the at least one master controller and from the at least one master controller to the at least one Internet hub.

12. The Internet based distributed control system of claim 11, wherein said web server further comprises:
an Ethernet chip for connecting the web server to the first Local Area Network;
a web server processor; and
a web server program memory including an Internet protocol stack and a parameter and variable memory space.

13. The Internet based distributed control system of claim 11, wherein said at least one master controller further comprises a master flash memory device which contains a table of authorized IP addresses corresponding to said at least one Internet hub from which the at least one master controller will accept authorized data packets.

14. The Internet based distributed control system of claim 13, wherein said authorized data packets are encrypted.

15. The Internet based distributed control system of claim 14, wherein human-machine interfaces for controllers in said at least one local control system are controlled by said at least one Internet hub.

16. The Internet based distributed control system of claim 15, wherein requests originated by said at least one client for programming said controllers, changing parameters of said controllers, and monitoring parameters or variables of said controllers must be sent to said at least one Internet hub.

17. The Internet based distributed control system of claim 1, wherein only said at least one Internet hub is authorized to send requests to said at least one local control system for programming controllers, changing parameters of said controllers, and monitoring parameters or variables of said controllers.

18. The Internet based distributed control system of claim 1, wherein a request issued by said at least one client to monitor a controller creates an open session between said at least one Internet hub and said controller and, while the session remains open, the controller provides regular status information to the at least one Internet hub.

19. The Internet based distributed control system of claim 1, wherein controllers are programmed with parameters and, if said parameters are exceeded, either alert messages or alarm messages are transmitted to said at least one Internet hub.

20. The Internet based distributed control system of claim 1, wherein alert messages or alarm messages received by said at least one Internet hub from said at least one local control system generate human readable messages which are transmitted to said at least one client or to a user.

21. The Internet based distributed control system of claim 1, wherein said at least one master controller may communicate with other master controllers in other local control systems by transmitting messages through the at least one Internet hub.

22. The Internet based distributed control system of claim 1, wherein said at least one master controller transmits a periodic heart-beat message to said at least one Internet hub, said heart-beat message including the unique serial number and the current IP address of the at least one master controller.

23. The Internet based distributed control system of claim 22, wherein said heart-beat message further comprises a message.

24. The Internet based distributed control system of claim 22, wherein said heart-beat message further comprises an alarm.

25. The Internet based distributed control system of claim 1, wherein said at least one master controller further comprises:
an Internet Protocol (IP) stack wherein said IP stack maintains an IP entry representing the IP address of each at least one Internet hub which has established an open session with said at least one master controller; and
a period stack wherein said period stack maintains a period entry associated with each IP entry in said IP stack.

26. A method of communicating with and controlling at least one local control system comprising the steps of:
providing at least one local control system with at least one master controller including a web server;
connecting said web server, through the Internet, to at least one Internet hub which includes a router;
connecting said at least one Internet hub, through the Internet, to at least one client;
transmitting communications from the at least one client to the at least one Internet hub; and
transmitting said communications from the at least one Internet hub to the web server.

27. The method of claim 26, wherein said at least one Internet hub further comprises an Extensible Markup Language (XML) server for converting transport layer protocol data packets into XML format messages.

28. The method of claim 27, wherein said at least one Internet hub further comprises a message server for converting XML format messages into human readable messages for transmission to users.

29. The method of claim 27, wherein said at least one Internet hub further comprises a client server for converting XML format messages into Hypertext Markup Language (HTML) messages.

30. The method of claim 27, wherein said at least one Internet hub further comprises a database for storing keys.

31. The method of claim 26, wherein said at least one local control system further comprises at least one slave controller.

32. The method of claim 31, wherein said at least one master controller further comprises:
a main processor; and
a web server including a shared memory for efficient and secure transmission of information from the at least one Internet hub to the at least one master controller and from the at least one master controller to the at least one Internet hub.

33. The method of claim 32, wherein said at least one master controller further comprises a master flash memory device which contains a table of authorized IP addresses corresponding to said at least one Internet hub from which the at least one master controller will accept authorized data packets.

34. The method of claim 33, wherein said authorized data packets are encrypted.

35. The method of claim 34, wherein human-machine interfaces for controllers in said at least one local control system are controlled by said at least one Internet hub.

36. The method of claim 35, wherein requests originated by said at least one client for programming said controllers, for changing parameters of said controllers, and for monitoring parameters or variables of said controllers must be sent to said at least one Internet hub.

37. The method of claim 26, wherein only said at least one Internet hub is authorized to send requests to said at least one local control system for programming controllers, for changing parameters of said controllers, and for monitoring parameters or variables of said controllers.

38. The method of claim 26, wherein a request issued by said at least one client to monitor a controller creates an open session between said at least one Internet hub and said controller and, while the session remains open, the controller provides regular status information to the at least one Internet hub.

39. The method of claim 26, wherein controllers are programmed with parameters and, if said parameters are exceeded, either alert messages or alarm messages are transmitted to said at least one Internet hub.

40. The method of claim 26, wherein said at least one master controller communicates with other master controllers in other local control systems by transmitting messages through the at least one Internet hub.

41. The method of claim 26, wherein said at least one master controller transmits a periodic heart-beat message to said at least one Internet hub, and said heart-beat message includes a unique serial number and a current IP address of the at least one master controller.

42. The method of claim 26, wherein said at least one master controller further comprises:

an Internet Protocol (IP) stack that maintains an IP entry representing an IP address of each of said at least one Internet hub which has established an open session with said at least one master controller; and a period stack that maintains a period entry associated with each IP entry in said IP stack.

* * * * *